United States Patent [19]

Tsukamoto

[11] 4,258,730
[45] Mar. 31, 1981

[54] ELECTROSTATIC AND MAGNETIC TOBACCO SMOKE FILTERING ARRANGEMENT

[75] Inventor: Kenkichi Tsukamoto, Tokyo, Japan

[73] Assignee: Seiko Tsukamoto, Tokyo, Japan

[21] Appl. No.: 931,404

[22] Filed: Aug. 7, 1978

Related U.S. Application Data

[62] Division of Ser. No. 661,355, Feb. 25, 1976, abandoned.

[30] Foreign Application Priority Data

Feb. 26, 1975 [JP] Japan .................................. 50-24215

[51] Int. Cl.³ .......................... A24D 3/04; A24D 3/06
[52] U.S. Cl. ............................... 131/170 R; 131/262 B
[58] Field of Search ........... 131/262 R, 170 R, 262 B, 131/10 M

[56] References Cited

U.S. PATENT DOCUMENTS

| 3,251,365 | 5/1966 | Keith et al. | 131/10.7 |
| 3,757,803 | 9/1973 | Chiang | 131/262 B |
| 3,998,232 | 12/1976 | Smith | 131/262 B |

FOREIGN PATENT DOCUMENTS 1356260  8/1964  France .................................. 131/262 B

OTHER PUBLICATIONS

Publication A. "Sokai No. 1" edited by My Health K.K. and Published by Kondasha K.K., p. 222, Jan. 1, 1976.

*Primary Examiner*—Vincent Millin
*Attorney, Agent, or Firm*—Bucknam and Archer

[57] ABSTRACT

A ring-type smoker's set for removing carbon monoxide and nicotine from tobacco smoke comprising a member capable of applying a magnetic field and a member capable of applying an electrostatic field.

7 Claims, 5 Drawing Figures

ELECTROSTATIC AND MAGNETIC TOBACCO SMOKE FILTERING ARRANGEMENT

This is a division, of application Ser. No. 661,355 now abandoned, filed Feb. 25, 1976.

The present invention relates to magnetized active carbon comprising active carbon and a magnet mixed therewith, a method for reinforcing activities of active carbon using this magnetized active carbon, and applications and devices related to said reinforcing method.

The present invention has been completed as a result of research work made with a view to highly reinforcing activities of active carbon such as adsorbing, catalytic and electron-collecting capacities and to providing industrially advantageous related applications and devices.

According to another aspect of the present invention, there is provided a composition comprising active carbon and a magnet mixed therewith which is effectively used for removing carbon monoxide and hydrogen and the like from cigarette or tobacco smoke.

Active carbon has a capacity to adsorb a variety of gaseous components ranging from those having a relatively low molecular weight to those having a high molecular weight, and it shows high adsorbing capacity even when the concentration of these gaseous components is very low. Further, the activities of active carbon are scarcely influenced by humidity, and it is able to exhibit its special capacities in a reaction field of either the vapor phase or liquid phase.

Active carbon has catalytic effect on sulfurous acid gas, nitrogen oxides, ozone, chlorine and the like, and, as is well-known in the art, it catalyzes them according to the following reactions:

Sulfurous acid gas:

$$SO_2 + \tfrac{1}{2}O_2 \rightarrow SO_3$$

and $$SO_3 + H_2O \rightarrow H_2SO_4$$

Nitrogen oxides:

$$NO + \tfrac{1}{2}O_2 \rightarrow NO_2$$

and $$4NO_2 + 2H_2O + O_2 \rightarrow 4HNO_3$$

Ozone:

$$2O_3 + C \rightarrow 2O_2 + CO_2$$

Chlorine:

$$2Cl_2 + 2H_2O + C \rightarrow 4HCl + CO_2$$

In an oxidizing atmosphere accelerating delectronation, active carbon present in the atmosphere controls diffusion of electrons and exerts an electron-collecting effect. Accordingly, active carbon has an activity of controlling the electromagnetic character value in such atmosphere.

Cigarette or tobacco smoke includes carbon monoxide, hydrogen and the like which inhibit the activity of the translation system (electron charge migration system) in the oral and bronchial tissues of a smoker and which are harmful to maintenance of the inherent characters of these tissues (magnetic field and electric field). Conventional active carbon products are very low in their effects of inhibiting and moderating these harmful effects of carbon monoxide, hydrogen and the like.

According to the present invention, there is provided a magnetized active carbon composition having a highly improved and heretofore unattainable effect of removing translation system-inhibiting substances such as carbon monoxide, hydrogen and the like, and by applying this magnetized active carbon composition to cigarette filters and the like, a novel detoxicating mechanism can be obtained. More specifically, the smoker can enjoy cigarette smoke having a character value of the electromagnetic field enhanced to a high level by cohesion of the magnetic field and orientation of the magnetic field and reduction of the living electromagnetic field inherent of the tissue of the respiratory tract can be inhibited (inhibition of the diluting effect can be attained).

There is a close relation between the electromagnetic character value of inhaled air and the effect of the cilia in removing foreign matter (phlegm, dust, pathogenic bacteria and the like), and reduction of the electromagnetic character value results in inhibition of this effect. In view of this fact, the detoxicating effect of the magnetized active carbon composition of the present invention will readily be understood.

Another object of the present invention is to provide a method and device for reinforcing the capacities of active carbon, in which at least one of a magnetic field and an electrostatic field is applied to a composition comprising active carbon and a magnet mixed therewith.

According to this method and device, smoke to be treated is contacted with an applied electrostatic field to increase the number of oriented and polarized particles in the smoke, and these particles are aggregated by the applied magnetic field and there is brought about a tendency that the quantity of the particles trapped in the magnetic field is increased. This tendency is preferred for providing a smoke having a high electromagnetic character value, and the cohesion activity of active carbon is reinforced by this tendency. The increase of the cohesion activity and the increase of the quantity of trapped particles will be apparent from the following formulae (1) and (2):

$$R = (10 \cdot M \cdot V / e \cdot H) \tag{1}$$

in which:
R = the radius of diffusion movement of oriented (charged) particle,
M = the mass of oriented (charged) particle,
V = the velocity of oriented (charged) particle,
e = the charge of oriented (charged) particle, and
H = the intensity of the applied magnetic field.

Namely, the diffusion movement radius is in reverse proportion to the intensity of the applied magnetic field, and the diffusion movement of particles is reduced with increase of the intensity of the applied magnetic field, resulting in enhancement of the tendency for particles to cohere.

Suppose that two oriented (polarized) particles in a smoke are at the center of the magnetic flux in the region of the magnetic field and that the magnetic flux is constant through the space between the particles (homogeneous magnetic flux) and is perpendicular to both the ends of the particles, the attractive force acting between the particles is expressed as follows [see M. Wada y A. Ohba, Manuscripto Recuperation de Hierro y Otros Minerales de Laterites, IX Congreso Latinamericano de Quimica, p. 4 (1965)]:

$$Fg = \frac{1}{2\mu_0 a_g} \left(\frac{J_g B_1 a_1}{g_1}\right)^2 = \frac{1}{2\mu_0 a_g} \left(\frac{J_g B_2 a_2}{g_2}\right)^2 \quad (2)$$

in which:
Fg = the attractive force between the particles,
$a_1$ = the cross-sectional area of particle 1,
$a_2$ = the cross-sectional area of particle 2,
$a_g$ = the cross-sectional area of the space between particles 1 and 2,
$g_1$, $g_2$, $g_3$ = the leakage coefficient of the magnetic flux,
$B_1$, $B_2$ = the flux density, and
$\mu_o$ = the magnetic permeability of the medium.

Namely, the attractive force acting between the two particles increases in proportion to the square of the magnetic flux to increase the aggregation and cohesion rate.

Prof. O. Warburg et al., biochemists of Max Plank Research Institute, Germany, conducted research work on autoxidation of amino acids catalyzed by active carbon and found that the catalytic activity of active carbon depends on the amount of iron present in the system [see O. Warburg, "Heavy Metal Prosthetic Group", p. 28, Oxford Univ. Press (1921)].

From the fact of conversion of p-hydrogen and o-hydrogen confirmed by the assay of the chemical activities of the molecules and surfaces of various crystals, it is apparent that molecules of hydrogen are changed when a magnetic field is applied thereto.

More specifically, molecules of hydrogen include two isomers, i.e., para-isomer and orthoisomer, and these isomers are generally present at a ratio of 1:3 and transformation of these isomers is practically impossible without use of a catalyst. The probability of this transformation is substantially zero from the viewpoint of the quantum theory. However, this transformation is made possible under application of a magnetic field [see U. Farkas and Z. Sachsse, Physik. Chem. (B), 23, 1 (1933) and Farkas, Ortho-hydrogene, Parahydrogene and Heavy Hydrogene (1935)].

Accordingly, the fact that the applied magnetic field makes changes in the symmetry of factors of the inherent function by changing the nuclear spin of hydrogen molecules from ↑↓ to ↑↑ means that the number of rotatory quanta is increased and the tendency of magnetic cohesion is intensified and that the structure of hydrogen molecules which are uneven in molecular weight and are gravimetrically unstable is simultaneously changed. In view of the fact that iron and a magnetic field are identical with each other in the point that each of them includes unpaired electrons at a very high density and the velocities of all the reactions depend on the level of non-localization, it is construed that the effect of increasing the ratio of removal of carbon monoxide and hydrogen according to the present invention is attained according to the following mechanism:

Magnetized active carbon having a magnet incorporated therein has its catalytic activity enhanced and carbon monoxide and hydrogen are converted to $CO_2$ and $H_2O$, respectively, by this enhanced catalytic activity according to the following reactions:

Carbon monoxide: $2CO + O_2 \rightarrow 2CO_2$

Hydrogen: $2H_2 + O_2 \rightarrow 2H_2O$

Raskin et al reported that the inherent intensity of the magnetic field of a living body is reduced by 4% by the death thereof (see Erwin Bauer & A. Raskin, Nature, p. 801, Nov. 7, 1936). Further, according to experiments by Senftle and Thorpe, it was confirmed that the magnetic susceptibility of cancered cells is much lower than that of normal cells (see Frank E. Senftle and Arthur Thorpe, C & EN, p. 38, May 29, 1961). Approaches based on the nuclear magnetic resonance (NMR) spectroscopy disclosed that the width of the protonic NMR signal of water is much narrower than the width of a protonic signal from a living macromolecule and since both the signals can easily be distinguished from each other, protonic signals are important for assay of aqueous components of complicated systems (biological systems). Namely, water of a cancered tissue can be distinguished from water of a normal tissue by measuring the spin lattice-moderating time in the spin echo nuclear magnetic resonance and the spin-spin moderating time. In other words, the most conspicuous characteristic of water of a cancered tissue resides in increase of the time of moderating the proton spectrum of tissue water.

Cancer is characterized by increase of the degree of freedom of motion in molecules of tissue water, more specifically, by increase of the non-orderly degree of hydrogen and difference of the Larmor period in protons, and proton signals of water of a cancered tissue are obviously different from radio waves emitted from a normal tissue (see Tumor Detection by Nuclear Magnetic Resonance, Science, March, 1971, vol. 171).

From the fact that the above-mentioned increase in the number of rotatory quanta caused by conversion of para-hydrogen→ortho-hydrogen has a great influence on the proton spectrum, the hydration and the structural change in water, it may be construed that transformation of the structure of molecules of tissue water is nothing but a change in the magnetic character. It has been proved that when electrons are arranged and the magnetic field is lost, cells cannot be controlled any more and they are cancered.

Further, as references proving that magnetism has a carcinostatic activity, there can be mentioned my own Japanese Pat. No. 319,970 specification (Japanese patent publication No. 3915/66) and an research report published by the Medicinal Department, Ohio University (see Cancer, August 1971).

Living substances of tobacco leaves are known to have a mesophase structure, and according to the classification based on the molecular orientation, cell membranes of tobacco leaves have a structure of semectic mesophase and chlorophyll has a structure of neumatic mesophase. The majority of other tissues of tobacco leaves include compounds of a structure of cholesteric mesophase which is a derivative of the sterol structure [see G. T. Stewart, Ordered Fluids and Liquid Crystals, 141 (1966) and The Journal of the American Oil Chemists' Society, 45, 120 (1968)].

Tobacco leaves, especially liquid crystals and groups of liquid crystals thereof, are partially caused to carry latently CO and/or H thereon and show the diffusion state, when they are smoked.

Cell membranes and other living substances of tobacco leaves have a characteristic property that they respond to a slight external force. Since constituent molecules of a liquid crystal can rotate or migrate in a space, it has very characteristic electric and magnetic properties. For example, cholesteric mesophase is converted to neumatic mesophase under application of an electrostatic field or a magnetic field. Since the spiral structure is converted to a structure in which molecules are parallelly oriented, this change is very violent, and further, this great change of the molecular orientation or arrangement is caused by application of a relatively small magnetic or electrostatic field.

In case of a typical model, the elastic energy of torsion is about $4 \times 10^{-3}$ Cal/M, and it is about $10^{-5}$ of the energy necessary for arranging all of the molecular axes.

According to Meyer, the electrostatic field (Ec) and magnetic field (Hc) causing transition are expressed as follows:

$$Ec = \frac{2\pi}{Po} \left(\frac{K_{22}}{\Delta Xe}\right)^{\frac{1}{2}} \text{ and } Hc = \frac{2\pi}{Po} \left(\frac{K_{22}}{\Delta Xm}\right)^{\frac{1}{2}}$$

in which:
Po = the spiral pitch at Ec=0 and Hc=0,
$\Delta Xe$ = the anisotropy of electric susceptibility,
$\Delta Xm$ = the anisotropy of magnetic susceptibility, and
$K_{22}$ = the torsion elasticity. (See R. B. Meyer, Applied Physics Letter, May 1, 1968.)

If in the above equations, Po=5,000 Å, the anisotropy $\Delta \epsilon$ of dielectric constant $\simeq 1.0$, the anisotropy $\Delta \mu$ of permeability $\simeq 1 \times 10^{-4}$ and $K_{22} \simeq 10^{-6}$ dyn, Ec is nearly equal to $10^5$ V/cm and Hc is equal to $10^5$ Oe, which values are substantially in agreement with found values.

Also Genneş stated, as a result of calculation of the phase transition by application of a magnetic field, that if Po$\simeq 1$ μm and $\Delta X \simeq 10^{-5}$, a value of Hc$\simeq 1.5 \times 10^4$ Oe is given (see P. G. De Gennes, Solid State Communications, 6, 163, 1968).

Molecules of living substances constituting liquid crystals of tobacco leaves (as well as liquid crystals of the respiratory tissue of a man) are oriented and polarized under application of an unimaginably small electric field or magnetic field as mentioned above, and direct causes of this phenomenon are the anisotropy of the dielectric constant and the anisotropy in the magnetic permeability.

A relation represented by the following equation is established between the above anisotropies and the electric and magnetic fields (see Acta Physicochim, USSR, 18, 358, 1943):

$$[|C| + |\epsilon\perp - \epsilon|||]E^2 = (\mu|| - \mu\perp)H^2$$

in which:
C = constant,
$\epsilon\perp$ = the dielectric constant in the direction perpendicular to the molecular axis,
$\epsilon ||$ = the dielectric constant in the direction parallel to the molecular axis,
E = electric field,
$\mu ||$ = the magnetic permeability in the direction parallel to the molecular axis,
$\mu\perp$ = the magnetic permeability in the direction perpendicular to the molecular axis, and
H = magnetic field.

In molecules of liquid crystals of tobacco leaves (as well as molecules of liquid crystals of the respiratory tissue of a man), the absolute value of the magnetic susceptibility is minimal in the direction of the molecular axis, and therefore, under application of a magnetic field, molecules and groups of molecules are magnetically oriented in the direction of the longer axis and the electric susceptibility (the intensity of the electric field) is increased.

Further, as will be apparent from the above equation, under application of an electric field, the magnetic susceptibility (the intensity of the magnetic field) is increased.

In case oxidation and peroxidation (each being deelectronation) are accelerated, in contrast to the case of application of an electric field, the intensity of the electric field is reduced, which, in turn, causes reduction of the intensity of the magnetic field. Namely, deelectronation results in demagnetization and demagnetization results in deelectronation.

From the physical viewpoint, either a magnetic field or an electrostatic field consists of photons, and the magnetic action is nothing but an electronic action. Since the magnetic field can be regarded as an arranged spin wave of electrons, it is considered that the magnetic field is nothing but an arranged field of electrons. Since all substances have an inherent magnetic character, each cell, tissue, organ or other organic body must have its inherent magnetic field, and in view of the fact that levels of energies of chemical linkages in molecules regulate possibilities of interrelations among respective substances, it can be considered that levels of energies of molecule linkages, which are to express magnetic characteristics of substances, are changed, in turn, by variations of magnetic characteristics in substances and are influenced by transformation of substances. Also an electric current forms a magnetic field, and a magnet can be regarded as an assembly of small currents. In contrast, the quantity of magnetism differs from the quantity of electricity in the point that it is not an unvariable quantity inherent of a substance, and the presence of a quantity of magnetism is a statistical phenomenon caused by ununiform distribution of particles having a magnetic moment. It is apparent that a small magnetic field formed by particles having a dipole moment in a certain system, namely a magnetic character of a substance, is influenced by the temperature, the external magnetic field (outside the system), the force of the electric field and the directivity to the directions of these magnetic and electric fields. An electric potential is generated as a result of a chemical interrelation of substances caused by change of the magnetic characters of the substances, and once the electric potential is generated, it comes to have influences on the magnetic character of the substance. Thus, an unseparable unit body, namely an electromagnetic state of a living tissue or a polarity, is generated through the actions of a living body. On the one hand, the polarity can be regarded as expressing a certain property involved in transformation of an organic substance, and on the other hand, the polarity per se clarifies the property of transformation of the substance. The change of the magnetic character in a substance and hence, the change of the polarity are naturally influenced through the living actions of the organic body.

It may be considered that the magnetic field causes different levels of susceptibility in a living body. More specifically, the magnetic field causes re-orientation of living macromolecules at the molecular level and it changes the direction of acting elementary particles (electrons, ions, etc.) and the intensity of the living body potential at the cellular level, whereby the speed of permeation of ions through cell membranes is changed. Accordingly, it is apparent that the magnetic field changes the direction and intensity of a biochemical processes advancing in cells.

All growth phenomena taking place on the earth involve a lethal factor therein. More specifically, when a living tissue continues growth, an optimum condition for survival of the tissue system (the balanced equilibrium) defined by the interrelation with the enviromental character value is arrived at.

However, at this point, the tissue system generally fails to perform self-control, and therefore, the optimum condition is passed and a climax condition is finally arrived at. Accordingly, the normal growth of the tissue system is inhibited and degeneration begins and the tissue system tends to be transformed to a tissue system in which a different metabolism is prevalent.

Harms of peroxides (deelectronated and demagnetized materials) and related phenomena are chemically fatal to living bodies living in an oxygen-containing atmosphere. They do various harms to living bodies through various mechanisms to cause malfunctions of various capacities of living bodies and reduction of defense strength in living bodies to bring about cancer of the lung and the like [see Kazuo Fukusumi, Oil Chemistry, 14, 119 (1965), and Hiroyuki Kono, Journal of Japanese Association of Eastern Medicine, 21 (4), 195 (1971)]. It is a significant problem that constituent proteins of living bodies which are known to be proteins having a translation system are deelectronated and demagnetized and thus converted to primitive proteins of the state free of the charge migration system such as were generated on the earth when there was neither light nor oxygen on the earth. When the translation system of a living body is inhibited by carbon monoxide, hydrogen and the like, the deelectronated and demagnetized state is brought about in the living body and the electric field and magnetic field (about $10^{-6}$ to $10^{-7}$ gauss) of the inherent maintenance character are diluted.

It is known that as a factor causing cancer, reduction of the defense strength of a living body should naturally be considered, and this reduction is nothing more than harm caused by peroxides (deelectronated and demagnetized materials).

Premature cancer of the lung does not always advance to progressive cancer. Actions of radial rays and various carcinogenic substances are related to formation of peroxides (deelectronated and demagnetized materials) and oxidation (deelectronation and demagnetization) of SH groups. Reduction of delayed allergic reactions or transplantation-rejecting reactions is a substantially important reason for the incurability of cancer, namely, this is the reason why cancer can be cancer. In view of the foregoing fact in the light of the immunity-controlling activity of radiation [the main action of which is considered to be due to peroxides (deelectronated and demagnetized materials)], it is apparent that generation of cancer is caused by harms of peroxides (deelectronated and demagnetized materials).

Various research work suggests that immunological control of auto-cancer (spontaneous cancer) will be possible.

Cancered living bodies are characterized by reduction of the activity of an enzyme (catalase) decomposing hydrogen peroxide, specific energy metabolism of capture of glucose from surroundings by vigorous sugar consumption of cancered cells, reduction of the speed of the reaction of removing peroxides (deelectronated and demagnetized materials) by glutathione and increase of excretion of polyamines. In other words, patients of cancer are characterized by an abnormal level of the serum SH group, creatine urine, abnormal metabolism of vitamin C, reduction of methylene blue-reducing activity of blood plasma or the like, an abnormal oxidation-reduction potential of blood, increase of values of peroxides (deelectronated and demagnetized material) in serum and reduction of the serum-dialyzing calcium value. Each of these characteristic symptoms suggests that cancer is a disease having a close relation to harms of peroxides (deelectronated and demagnetized materials).

In the field of molecular biology, it is known that the peroxidized state (deelectronated and demagnetized state) in a living body inhibits the duplicating mechanism by nucleic acids (see Lester Backer and James Smith, Laurence-Barkley Laboratory, California University; Bulletin of American Science Academy, 1974).

As the mitosis of cells having a biochemically stable mechanism, there can be mentioned metabolism of nucleic acids (DNA and RNA). DNA is discontinuously synthesized, and RNA is first synthesized prior to synthesis of DNA (see Reiji Okazaki, Molecular Biological Laboratory, Collection of Experimental Reports, 1972).

By V. U. Strekova, G. A. Tarakanova, V. P. Prudnikova and U. I. Novitskiiv, it was confirmed that RNA of the normal growth stage is remarkably increased in a living body by application of a magnetic field (see Fiziol. Past 12: 920–929, 1965).

It is also known that in cancered cells, magnetism remarkably inhibits synthesis of DNA and RNA.

In view of the foregoing knowledge, it will readily be understood that electromagnetic fields and environments of electromagnetic fields are very important for continuing reproduction in a living body without having harmful influence on nucleic acids, and that in electromagnetic field environments sufficient not to unbalance the dynamic equilibrium, normal metabolism of nucleic acids is enhanced and metabolism of cancering nucleic acids is inhibited.

It is known that inhalation of air having a high electromagnetic character value is effective for restoring normal biological states in abnormal functions of organs in a living body.

Generally speaking, anions (magnetic ions) contribute to activation of parasympathetic nerves and cations (magnetic ions) contribute to activation of sympathetic nerves. It is known that these magnetic ions in the mixed state correct the acid-alkali equilibrium in blood, reduce the blood pressure, have a curing effect on anemia, removes fatigue by promoting functions of cell endoplasm and have effects of curing biolysis, moderating inflammations and curing incised wounds and the like. It is said that the ideal density of magnetic ions (as anions) necessary for maintenance of the health in human bodies is 400 to 1000 ions per cc of air.

Tables 1 and 2 show densities of air ions (magnetic ions) at various places in Japan, magnetic characteristics (magnetic susceptibility) of air and compositions of air.

TABLE 1

| Place | Ion Density | |
|---|---|---|
| | negative ions | positive ions |
| mountain | 692 | 670 |
| suburbs | 230 | 270 |
| city | 101 | 150 |
| subway | 117 | 279 |
| ship (engine room) | 30 | 40 |
| office | 38 | 43 |
| living room in suburbs | 114 | 170 |
| air conditioned room | 56 | 70 |
| factory | 53 | 73 |

Note:
Each value is in terms of the number of ions per cc of air and the measurement was conducted from September to December, 1965 (see date concerning "Yothtron," an air ion generator manufactured by Ikegami Tsushinki Kabushiki Kaisha).

TABLE 2

| Component | Magnetic Susceptibility, $1 \times 10^{-6}$ e.m.u. | % by Volume | % by Weight | Partial Pressure mmHg |
|---|---|---|---|---|
| $N_2$ | −0.34 | 78.63 | 75.47 | 593.02 |
| $O_2$ | 106.20 | 20.99 | 23.20 | 159.52 |
| Ar | −0.45 | 0.93 | 1.28 | 7.144 |
| $CO_2$ | −0.42 | 0.33 | 0.04 | 0.228 |
| (CO) | −1.85 | — | — | — |
| $H_2$ | −1.97 | 0.01 | 0.001 | |
| Ne | −0.33 | 0.0013 | 0.0012 | 0.088 |
| He | −0.47 | 0.005 | 0.00007 | |

[1] The air composition and the magnetic susceptibility of each component as measured at 20° C. are shown.
[2] The fact that all gases other than oxygen have a negative value magnetic susceptibility indicates that each of them is a diamagnetic substance.

Smoked substances formed on smoking of cigarettes are substances having a very low electromagnetic character value, which inhibit the translation system in tissues of the lung and respiratory tract of the human smoker, and among substances inhaled by a man, they are typical instances of deelectronated and demagnetized materials having an electronic and magnetic dilution effect harmful to maintenance of the inherent characters (electric field and magnetic field) of living tissues and surrounding electromagnetic fields. However, according to the present invention, since ratios of removal of carbon monoxide, hydrogen and the like are remarkably enhanced and it is made possible to form smoked substances of tobacco having an electromagnetic tendency (character) remarkably enhanced by dielectric polarization and/or orienting polarization and hence, having an improved resistance to dilution of surrounding electromagnetic fields, the mechanism of the translation system in tissues of a human body (oral cavity, nasal cavity, bronchus, lung and the like) can be effectively maintained and formation of peroxides (deelectronated and demagnetized materials) can be inhibited. In short, harms of smoking, especially risk of cancer, can be advantageously moderated according to the present invention.

Still another object of the present invention is to provide a method for controlling reactions in soil, in which a composition comprising active carbon and a magnet mixed therewith is used for converting nitrogen oxides (NO, $NO_2$ and the like) to nitrogen of the nitrate form.

A nitrogenous fertilizer used as a growth promotor for cultivation plants and turfs forms large quantities of nitrogen oxides in an applied field (soil), and these substances are finally transferred into the stratosphere to show an effect of reducing ozone. Nitrogen fertilizer is acting as a primary agent in destroying the ozone layer of the stratosphere and the corresponding drastic increase in the ratio of generation of skin cancer.

The magnetized active carbon of the present invention including a magnetized substance has a much higher catalytic activity on conversion of these harmful nitrogen oxides to nitric acid according to the reaction represented by the above-mentioned chemical reaction formula than conventional active carbon products. Accordingly, when the magnetized active carbon composition of the present invention is applied to soil, the above-mentioned problem of increase of generation of skin cancer can be greatly moderated.

Magnetized substances such as Fe, $Fe_3O_4$, $\gamma\text{-}Fe_2O_3$ and the like are preferably incorporated in active carbon according to the present invention. In general, there may also be employed magnetized ferromagnetic substances such as ferrite of the inverse-spinel type structure, ferrite of the magnetoplumbite structure, ferrite of the garnet type structure, ferrite of the probeskite structure, ferrite of the ilmenite structure, ferrite of the rutile type structure, Ferroxplana, rare earth cobalt, manganese-aluminum, manganese-bismuth, copper-nickel, Heusler's alloy ($MnCu_2Al$, $MnCu_2Sn$, $Mn_3Cu_6Sn$).

Ferrite of the inverse-spinel type structure is represented by the general formula $MO.Fe_2O_3$ (in which M stands for at least one divalent metal). For example, there can be mentioned $CuFe_2O_4$, $MgFe_2O_4$, $NiFe_2O_4$, $Ni_{0.3}Zn_{0.45}Fe_{2.25}O_4$, $Co_{0.8}Fe_{2.2}O_4$, $Co_{0.3}Mn_{0.4}Fe_2O_4$, $Co_{0.3}Zn_{0.2}Fe_{2.2}O_4$, $Zn_{0.61}Fe_{2.39}O_4$, $MnFe_2O_4$, $Mn_{0.45}Zn_{0.35}Fe_{2.2}O_4$, $Mn_{0.38}Ni_{0.39}Fe_{2.23}O_4$, $MnTi_{0.44}Fe_{1.56}O_4$ and the like.

Ferrite of the magnetoplumbite structure is represented by the general formula $MO.6Fe_2O_3$ (in which M stands for at least one divalent metal). Ferrite of the garnet type structure is represented by the general formula $3M_2O_3.5Fe_2O_3$ (in which M stands for at least one trivalent metal). Ferrite of the probeskite structure is represented by the general formula $M_2O_3.Fe_2O_3$ (in which M stands for at least one trivalent metal). Ferrite of the ilmenite structure is represented by the general formula $A^{2+}.B^{4+}+O_3$. For example, there can be mentioned $FeTiO_3$, $Fe_{2-x}Ti_xO_3(1>x\geq 0.5)$, $CoMnO_3$, $NiMnO_3$ and the like. As the ferrite of the rutile type structure, there can be mentioned, for example, $CrO_2$. Ferroxplana is represented by the general formula $Fe_2O_3$—$BaO$—$M^{2+}O$ (in which M stands for Mn, Fe, Co, Ni, Cu, Mg or Zn).

Ferromagnetic substances are generally magnetized by a known method of application of an external excited magnetic field. It is also possible to perform magnetization by adjusting the particle size of a ferromagnetic substance to the spontaneous magnetizing size.

Examples of spontaneous magnetizing particle sizes are as shown below.

TABLE 3

| Magnet | Critical Diameter ($\mu$) in Single Magnetic Domain | Upper Critical Diameter* ($\mu$) in Single Magnetic Domain |
|---|---|---|
| MnBi | 0.8 | 8.0 |

TABLE 3-continued

| Magnet | Critical Diameter ($\mu$) in Single Magnetic Domain | Upper Critical Diameter* ($\mu$) in Single Magnetic Domain |
| --- | --- | --- |
| $BaO \cdot 6Fe_2O_3$ | 1.0 | 10.0 |
| $\gamma\text{-}Fe_2O_3$ | 0.4 | 1.5 |
| $Fe_3O_4$ | 0.4 | 2.0 |

*the critical diameter at which the activity of the magnetic domain wall is lost.

Magnetic characteristics (saturation magnetization values as measured at 20° C.) of preferred magnets are as follows:

TABLE 4

| | Magnetic Characteristics (saturation magnetization value as measured at 20° C.) | | |
| --- | --- | --- | --- |
| Magnet | $\sigma$ gauss cc/g | Ms gauss | $4\pi$ Ms gauss |
| $Fe_3O_4$ | 92 | 480 | 6000 |
| $MnFe_2O_4$ | 80 | 400 | 5000 |
| $CoFe_2O_4$ | 80 | 425 | 5300 |
| $NiFe_2O_4$ | 50 | 270 | 3400 |
| $CuFe_2O_4$ | 25 | 135 | 1700 |
| $MgFe_2O_4$ | 27 | 120 | 1500 |
| $Li_{0.5}Fe_{2.5}O_4$ | 65 | 310 | 3900 |

It must be understood that the active carbon used in this invention includes not only active carbon products formed by known chemical activating and gas activating methods but also active carbon products prepared by mechanical grinding (frictional pulverizing) methods and ordinary heat-treating methods.

It is preferred that the magnet be incorporated into active carbon in an amount of 30 to 100 parts by weight per 100 parts by weight of active carbon. In the present invention, however, sufficient effects can be obtained if the magnet is incorporated in an amount of about 5 parts by weight per 100 parts by weight of active carbon, and in some cases, intended effects can be attained even if the amount of the magnet is smaller than the above. The upper amount of magnet incorporation varies depending on the intended application. A suitable mixing ratio may be selected depending on the intended use, application conditions and the like.

As the magnetic field to be applied for magnetization, there can be mentioned magnetic fields of permanent magnets and ordinary electric magnets.

The magnet to be incorporated in active carbon has preferably a powdery or granular form or other similar shape. When a device for applying a magnetic field for magnetization is employed, it is preferred that the magnet be of a ring-like, pipe-like form or other similar form, but the shape of the magnet is not limited to such form. Appropriate shapes or forms which are considered effective for attaining the objects of the present invention may optionally be chosen within the scope of the present invention.

The magnetized active carbon of the present invention can be prepared, for example, in the following manners.

Active carbon is physically mixed with a magnet, and if desired, the mixture is excited by a known method. In this case, the particle sizes may be adjusted to application sizes prior to the mixing treatment, or they may be adjusted after the mixing treatment. Further, the magnetized active carbon of the present invention may be prepared by mixing a magnet with a carbon material such as tar pitch, coconut husk carbon or sawdust carbon, molding the mixture into a prescribed form, subjecting the molded product to a known activating treatment and if desired, exciting the molded product. In some cases, a non excited ferromagnetic substance may be used in place of the magnet.

The shape and size of active carbon to be used in the present invention are not particularly critical, and those of commercially available products may be adopted in the present invention. It is most preferred that the size of the active carbon be within a range of 110 to 0.25 mesh. Also the shape and size of the magnet may optionally be chosen appropriately depending on the intended use as in the case of active carbon.

In the treatment of smoke of tobacco, the magnetized active carbon exerts intended effects when it is located in a place through which smokes pass. For example, the magnetized active carbon of the present invention may be located in a cigarette filter, in a cigarette holder or the like.

As the electrostatic field to be applied in the present invention, there can be mentioned, for example, a negative electrode, a positive electrode, a non-insulating (uncovered) electric circuit, and negative and positive electrostatic potentials. As the element constituting an electrostatic field, there can be mentioned an ordinary small battery, an isotope battery and an electret. A radio electret including a minute amount of isotope without fear of leakage of radial rays or a magnetic electret in combination with a permanent magnet is especially effective.

One embodiment of the present invention is illustrated in the accompanying drawings.

In these Figs., reference numeral 1 denotes a ring-like plastic molded article, and a permanent magnet 2 is disposed in the plastic molded article 1. Further, a battery 4 and a resistance 4 are disposed in the plastic molded article 1. Referential numeral 5 denotes an electric circuit. The battery 3 has a cathode 6 and an anode 7. Reference numeral 8 denotes a needle-like terminal-connecting switch, opening or closing of which is controlled by a spring 9. Reference numeral 10 denotes a radio electret and the electrostatic field of the radio electret 10 is transferred by a conductor 11. Reference numerals 12 and 13 denotes an electrostatic pole and a commercially available cigarette provided with a ring-like cigarette filter, respectively. When the switch 8 is depressed on smoking and inserted into a cigarette and terminals of the circuits are connected (FIGS. 1 and 2) or the potential is transferred (FIG. 3), an electrostatic energy is actuated on the smoke and it is applied together with a permeative magnetic energy from the permanent magnet 2.

The present invention will now be described by reference to the following Examples that by no means limit the scope of the invention but illustrate embodiments of the invention.

EXAMPLE 1

Results of the analysis of smoke formed when the ring-type cigarette filter (smoker's set) of the present invention was employed are shown in Table 5.

TABLE 5

| | Smoke Introduced in Oral Cavity | |
|---|---|---|
| Ring-Type Cigarette Filter | decrease (wt.%) of carbon monoxide | decrease (wt.%) of nicotine |
| A. No ring-type cigarette filter was used (control) | 0 | 0 |
| B. Ring-type cigarette filter having positive and negative terminal-connecting conductive wire circuit mechanism was used | 20.1 | 27.5 |
| C. Ring-type cigarette filter having mechanism for applying electrostatic potential of electret was used | 15.0 | 25.2 |
| D. Ring-type cigarette filter having only permanent magnet including magnetic line force-applying mechanism was used | 24.8 | 30.0 |
| E. Ring-type cigarette filter having positive and negative terminal-connecting conductive wire circuit and mechanism for applying magnetic field of permanent magnet was used | 52.7 | 55.0 |
| F. Ring-type cigarette filter having mechanism for applying electrostatic potential of electret and mechanism for applying magnetic field of permanent magnet | 58.4 | 50.3 |

Figure 4:
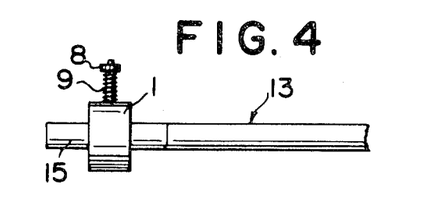
FIG. 4 is a view showing the state where a ring-type cigarette filter as mentioned above is attached to a commercially available cigarette.

Commercially available filter-tipped cigarettes including a filter of an acetate fiber layer, which are sold under the tradename "PALL MALL," were used as control cigarettes. Various ring-like cigarette filters (smoker's sets), as shown in FIG. 4, were attached to the control cigarettes. These filters were 18 mm in outer diameter, 7.8 mm in inner diameter and 8 mm in thickness. Structures of these filters will now be described by using the referential numerals appearing in the drawings.

Figure 1:
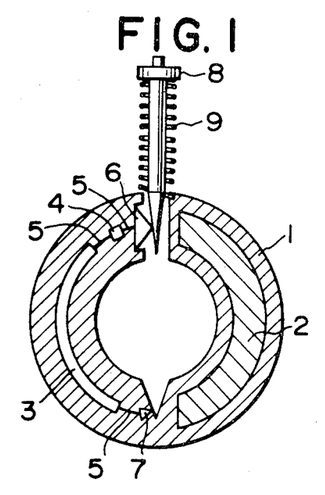
FIG. 1 shows a structure of a ring-type cigarette filter (smoker's set) including a magnetic field for magnetization and a conductive wire circuit.
Figure 2:
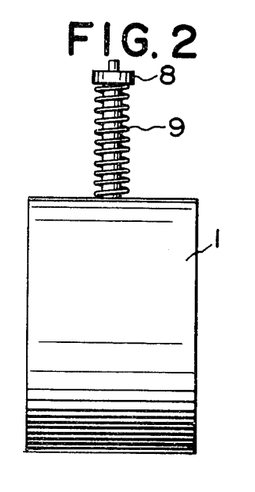
FIG. 2 is a side view of the structure shown in FIG. 1.

Ring-type cigarette filter B:

A ultra-small battery 3 arranged so that a current of 2.8 μA was caused to flow in an uncovered needle-like conductive wire circuit (4, 5, 6, 7 and 8) by connecting the terminals thereof was built in the ring-type cigarette filter.

Figure 3:
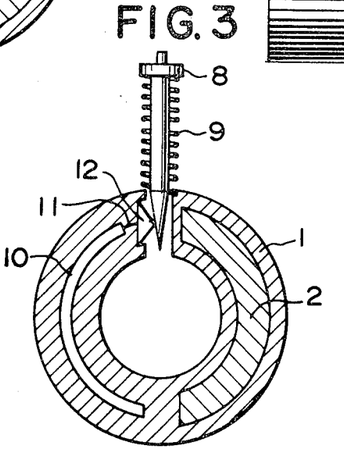
FIG. 3 shows a structure of a ring-type cigarette filter including a magnetic field for magnetization and an electrostatic potential discharge device.

Ring-type cigarette filter C:

A radio electret 10 composed of Tefron resin was arranged to transmit a surface electrostatic potential energy of $1.2 \times 10^{-7}$ coulomb/cm$^2$ to a smoke passage through an uncovered needle-like conductive wire (depressing needle 8). The radio electret was built in the ring-like cigarette filter.

Ring-type cigarette filter D:

Only a permanent magnet having a magnetic flux density of 700 Gauss and a coercive force of 850 Oe was built in the ring-type cigarette filter.

Ring-type cigarette filter E:

The same ultra-small battery 3 as mentioned above with respect to the filter B and a permanent magnet 2 having a magnetic flux density of 700 Gauss and a coercive force of 850 Oe were built in the ring-type cigarette filter.

Ring-type cigarette filter F:

The same Tefron resin radio electret 10 as mentioned above with respect to the filter C and a permanent magnet 2 having a magnetic flux density of 700 Gauss and a coercive force of 850 Oe were built in the ring-type cigarette filter.

After these ring-type cigarette filters (smoker's sets) were attached to cigarettes, the needle-like terminal-connecting switch 8 was depressed (except in the case of the filter having a permanent magnet alone), and while an electric field was thus being applied, sample cigarettes were burnt and smoke was inhaled according to a known method until about ¾ of the total length of each cigarette from the tip thereof was burnt away. More specifically, the time per inhalation was 2 seconds, the inhalation interval, was 30 seconds and the inhaled volume was 40 ml/2 seconds. Under these conditions, by using a known smoking machine, cigarettes were burnt and formed smoke was trapped. The quantities of carbon monoxide and nicotine in these trapped smokes were determined by a known analyzing method. The measured values are indicated in Table 5 above. In Table 5, each value is a mean value obtained by conducting the test on 10 sample cigarettes.

From the results shown in Table 5, it is apparent that remarkable effects can be attained by the ring-type cigarette filters of the present invention.

When the above test was similarly made by changing the thickness of the ring-type cigarette filter to 2 mm or 15 mm, similar results were obtained.

In conventifonal products such as acetate filters, cotton filters, active carbon filters and the like, the filtering capacity is naturally limited because the inhalation resistance and air permeation is chosen within ranges providing good smoking conditions. In contrast, the ring-type cigarette filter has no factors inhibiting good smoking conditions, such as the inhalation resistance and the air permeation surface. Furthermore, in conventional pipes or holders, there is often experienced an unpleasant smell caused by remaining tobacco tar and the like. In contrast, products of the present invention are quite free of such unpleasant smell and do not impair the taste of tobacco.

EXAMPLE 2

Results of another experiment showing effects of the present invention are shown in Table 6.

TABLE 6

| | Smoke Introduced in Oral Cavity | |
|---|---|---|
| Cigarette Filter | decrease (wt.%) of carbon monoxide | decrease (wt.%) of hydrogen |
| G. filter free of active carbon and magnet powder (control) | 0 | 0 |
| H. filter including active carbon alone | 17.0 | 22.0 |
| I. filter including mixture 16 of active carbon and magnet powder | 31.0 | 40.0 |
| J. filter including only magnet powder (10 mg) (control) | 10.0 | 7.5 |

Figure 5:
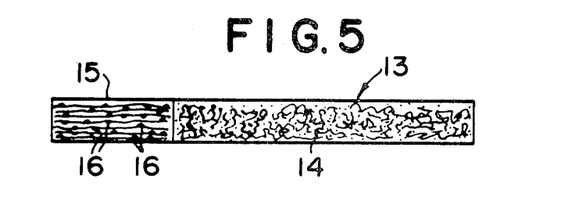
FIG. 5 is a view showing an embodiment in which a mixture 16 of active carbon and magnet powder is dispersed in a filter 15 fixed to one tip end of a portion to be smoked of a cigarette.

Table 6 illustrates results of the analysis of smoke passed through a filter comprising the magnetized active carbon composition comprising active carbon and a magnet mixed therewith. Cigarettes having a filter of an acetate fiber layer, which are commercially available under the tradename "Peace" in Japan, were used as sample cigarettes (control). The filter 15 was taken out of a portion 14 to be smoked, and instead, a filter comprising 30 mg of active carbon having a size of 100 to 110 mesh (control) or a filter comprising 20 mg of active carbon and 10 mg of magnet powder (composed of a mixture of 2 mg of Fe having a size of $0.1\mu$, 4 mg of $\gamma\text{-}Fe_2O_3$ having a size of $1.3\mu$ and 4 mg of $Fe_3O_4$ having a size of $1.8\mu$) was attached to the smoked portion 14 again. According to the method described in Example 1, the cigarette was burnt and smoke was inhaled until about ¾ of the total length was burnt away. Carbon monoxide and hydrogen in inhaled smoke were determined to obtain results shown in the above Table 6. In the Table 6, each value is a mean value obtained by conducting the test on 10 sample cigarettes.

From the above results, it will readily be understood that the filter of the present invention has the highest effect among the foregoing filters.

EXAMPLE 3

In order to clarify the effects attainable by combined use of a ring-type electromagnetic field-applying device in using a cigarette filter comprising active carbon and magnet, the experiments A, B, C, D, E and F described in Example 1 were conducted under the same conditions by using as a control sample the same "Peace" cigarette provided with a filter comprising active carbon and magnet, as used in the experiment I described in Example 2.

Results of the analysis of smoke are shown in Table 7.

TABLE 7

| | Smoke Introduced in Oral Cavity | |
|---|---|---|
| Experiment No. | decrease (wt.%) of carbon monoxide | decrease (wt.%) of hydrogen |
| $A_I$ | 0 | 0 |
| $B_I$ | 25.6 | 23.2 |
| $C_I$ | 20.0 | 29.0 |
| $D_I$ | 35.1 | 39.5 |
| $E_I$ | 57.7 | 57.7 |
| $F_I$ | 59.0 | 55.4 |

As is apparent from the foregoing results, the effects of a cigarette filter comprising active carbon and magnet are highly accelerated and enhanced by overlapped application of magnetic and electric fields by the above-mentioned ring-type device, and significant contributions can be attained in improving of ratios of removal of carbon monoxide and hydrogen.

EXAMPLE 4

In order to compare the magnetized active carbon with conventional active carbon products with respect to the catalytic effect to nitrogen oxides (the effect of converting nitrogen oxides to nitrogen of the nitrate state), comparative experiments were conducted according to the following methods A, AN, B and BN.

Method A:

0.05 g of conventional active carbon and 0.05 g of magnetized active carbon comprising 0.03 g of the same conventional active carbon and 0.02 g of $Fe_3O_4$ homogeneously mixed with the active were separately mixed with 40 g of air-dried paddy field soil, and the mixtures were placed in long bottomed cylinders (3.2 cm in inner diameter and 10 cm in height). Water was added to each mixture and the mixture was sufficiently agitated to remove bubbles. Then, water was further added to cover the soil portion to a depth of 1 cm. The filled cylinders were allowed to stand still at 35° C. for 3 weeks. The contents of nitrogen oxides and nitrogen of the nitrate state formed during this period were determined.

Method AN:

The experiment was conducted in the same manner as in the above method A except that a homogeneous mixture of 40 g of air-dried paddy field soil and 0.04 g of a nitrogeneous fertilizer (urea) was used instead of the soil used in the method A. The contents of nitrogen oxides and nitrogen of the nitrate state were similarly determined.

Method B:

The experiment was conducted in the same manner as in the above method A except that no active carbon was used. The contents of nitrogen oxides and nitrogen of the nitrate state were similarly determined.

Method BN:

The experiment was conducted in the same manner as in the above method B except that a homogeneous mixture of 40 g of air-dried paddy field soil and 0.04 g of a nitrogeneous fertilizer (urea) was used. The contents of nitrogen oxides and nitrogen of the nitrate state were similarly determined.

Experimental results are shown in Table 8.

TABLE 8

| Sample Tested | Nitrogen Oxide Content* (ppm in 100g of air-dried paddy field soil) | Nitrate Form Nitrogen Content (mg per 100g of air-dried paddy field soil) |
|---|---|---|
| Method A: | | |
| conventional active carbon (control) | 8.3 | 0.20 |
| magnetized active carbon | 6.1 | 0.35 |
| Method B: | | |
| conventional active carbon (control) | 60.0 | 11.55 |
| magnetized active carbon | 45.2 | 19.00 |
| Method B (reference) | 75.0 | 0.09 |
| Method BN (reference) | 250.0 | 2.32 |

*the nitrogen oxide content (ppm) was a value as calculated as $NO_2$.

As is apparent from the above results, the magnetized active carbon shows a nitrate state nitrogen-forming effect higher by about 64 to about 75% than the effect attainable by conventional active carbon and a nitrogen oxide formation-controlling effect higher by about 33 to about 36% than the controlling effect attainable by conventional active carbon. In short, the magnetized active carbon of the present invention has excellent effects with respect to reactions in soils.

What is claimed is:

1. A ring-type smoker's set for removing carbon monoxide and nicotine from smoke of tobacco which comprises a combination of a member capable of applying a magnetic field and a member capable of applying an electrostatic field.

2. A ring-type smoker's set according to claim 1 wherein the member capable of applying the magnetic field comprises a magnetized material.

3. A ring-type smoker's set according to claim 2 which comprises a member which is a combination of a magnetized material with means having a positive and negative terminal-connecting conductive wire circuit.

4. A ring-type smoker's set according to claim 2 which comprises a member which is a combination of a magnetized material with means for applying the electrostatic potential of an electret.

5. A ring-type smoker's set according to claim 1 wherein the member capable of applying the electrostatic field comprises means having a positive and negative terminal-connecting conductive wire circuit.

6. A ring-type smoker's set according to claim 1 wherein the member capable of applying the electrostatic field comprises a means having a mechanism for applying the electrostatic potential of an electret.

7. A ring-type smoker's set which comprises an article including a magnetized active carbon composition and a combination of a member for applying a magnetic field and a member for applying an electrostatic field.

* * * * *